Patented Feb. 18, 1936

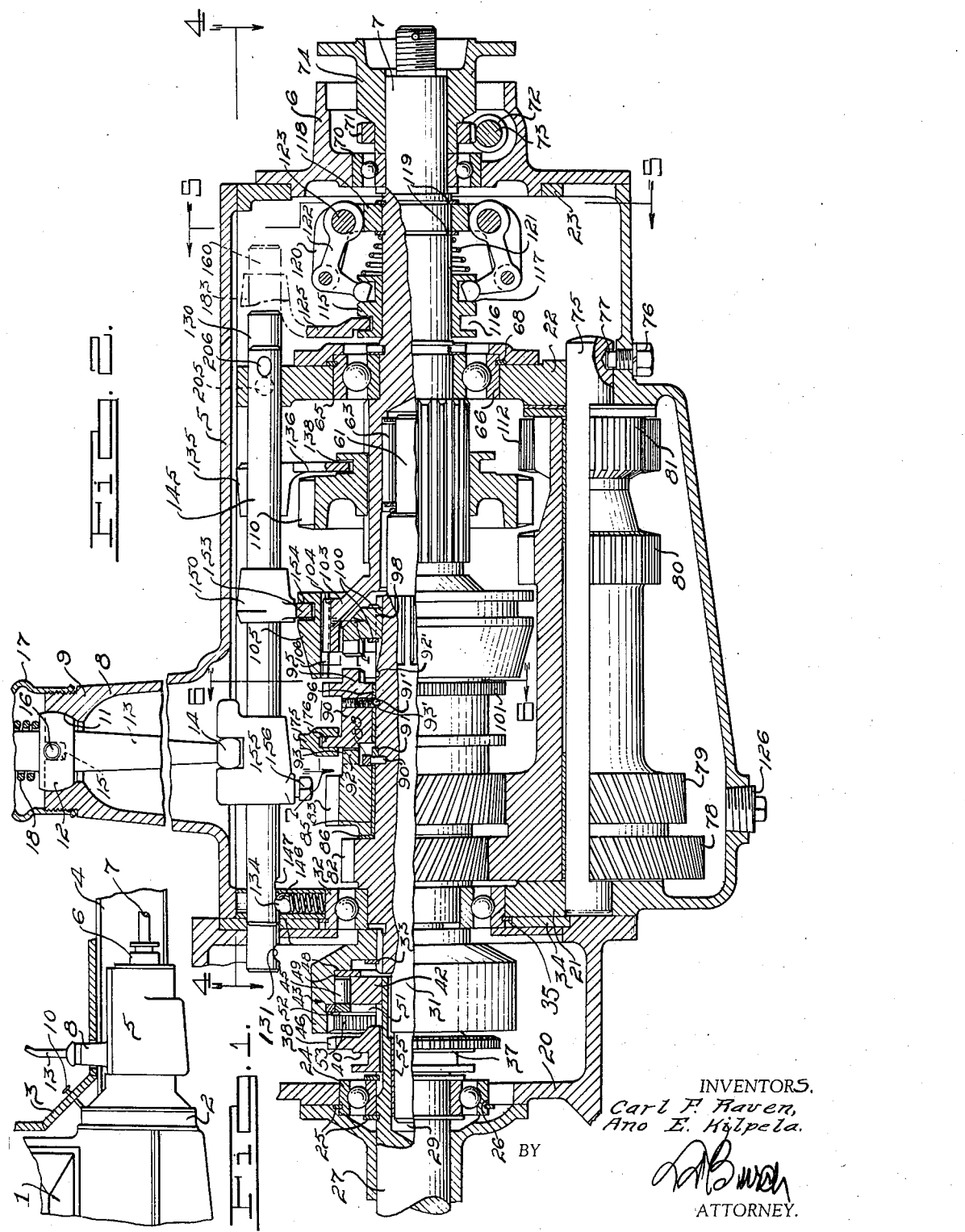

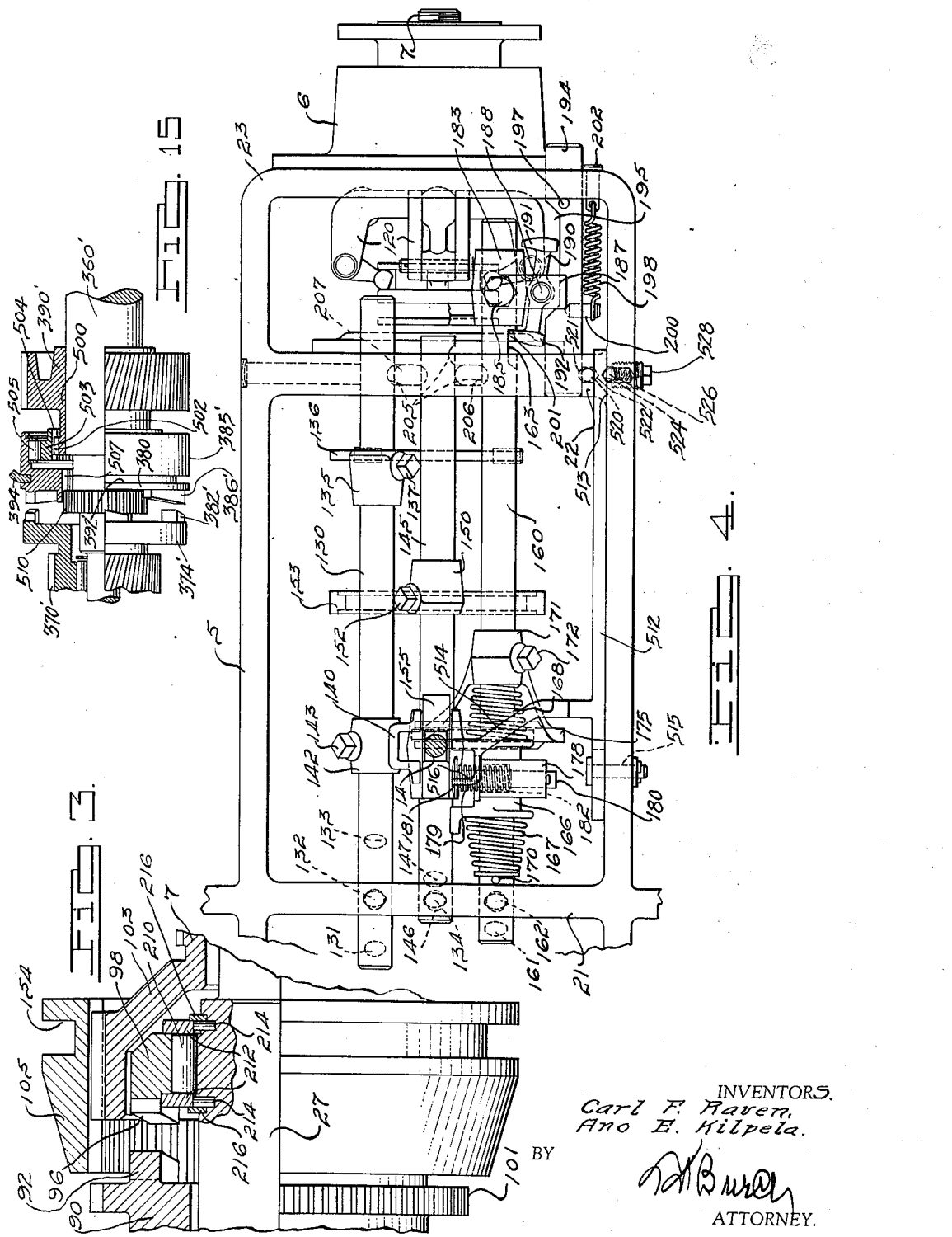

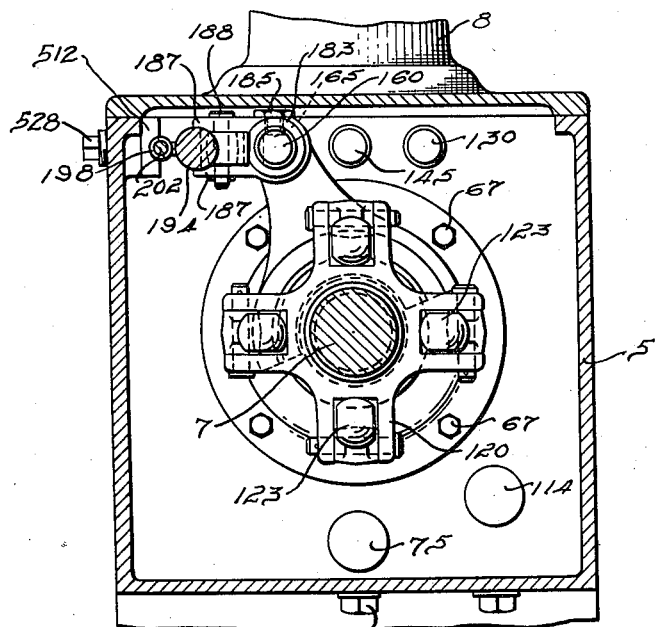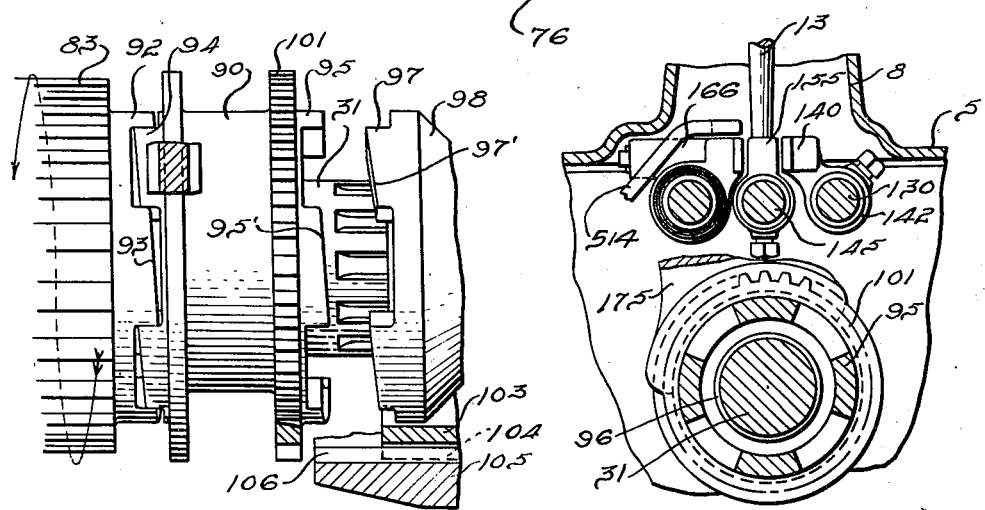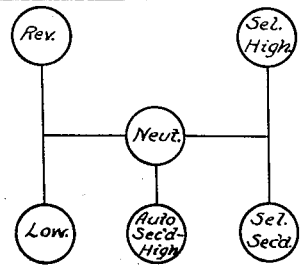

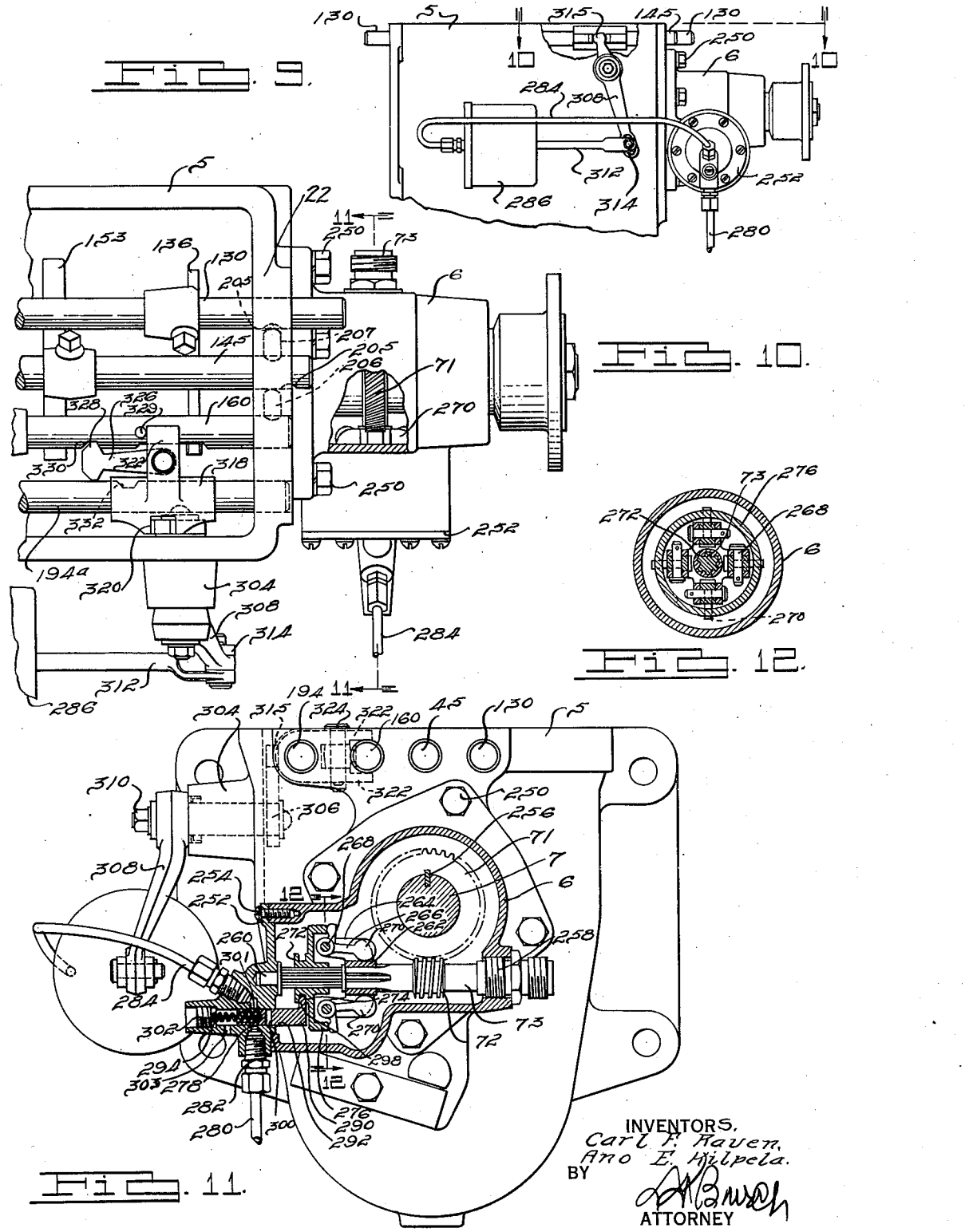

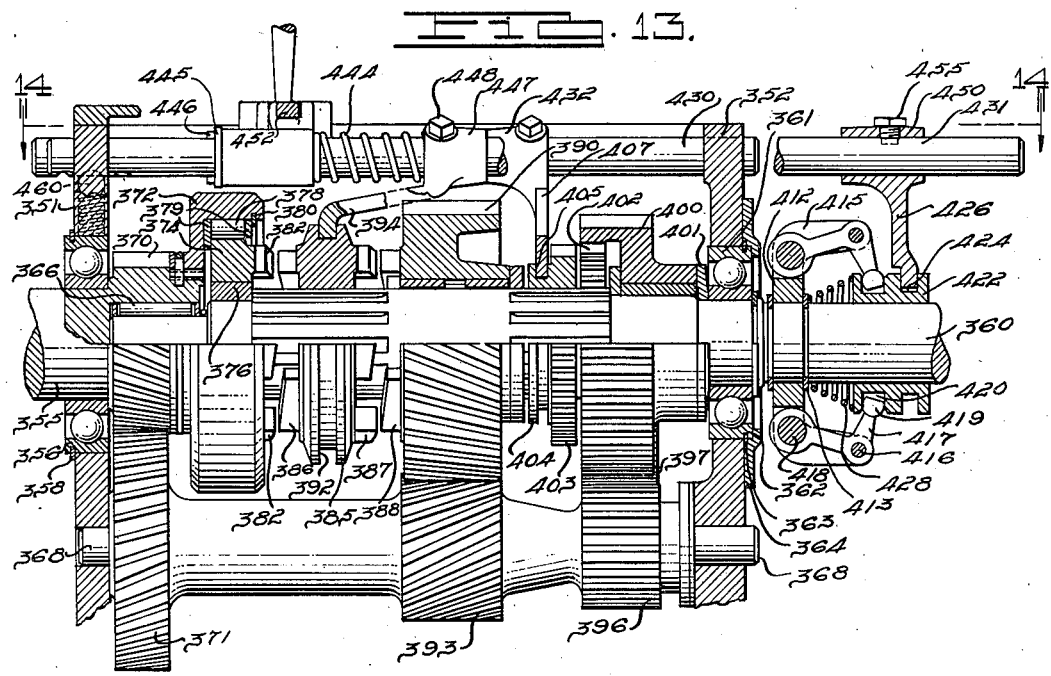
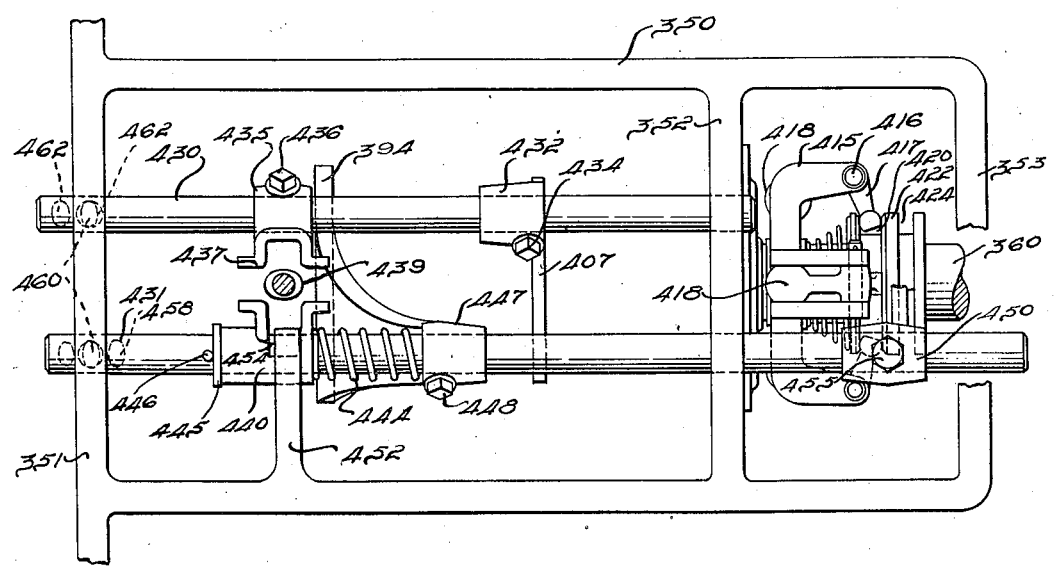

2,031,067

UNITED STATES PATENT OFFICE 2,031,067

AUTOMATIC TRANSMISSION

Carl F. Rauen, Grosse Pointe, and Ano E. Kilpela, Detroit, Mich., assignors, by mesne assignments, to Borg-Warner Corporation, a corporation of Illinois Application August 3, 1933, Serial No. 683,449

11 Claims. (Cl. 74—336.5)

This invention, in general, relates to automatic transmissions and, as illustrated, is particularly adapted for use in automotive vehicles. The invention comprises a novel construction of an automatic change speed mechanism for operatively connecting a driven shaft with a driving shaft in a plurality of different gear ratios, automatically operable mechanism for changing from an intermediate gear ratio to a high gear ratio or from a high gear ratio to an intermediate gear ratio, and means operable at any time after a predetermined speed of the driven shaft has been attained for controlling the operation of the gear changing mechanism.

An object of the invention, therefore, is to provide a transmission in which the change from an intermediate gear ratio to a high gear ratio or vice versa, may be automatically effected, at any time after a predetermined speed of rotation of the driven shaft has been attained, in accordance with the volition of the operator.

Another object of the invention is to provide a transmission in which the change from an intermediate gear ratio to a high gear ratio will be automatically effected at any time after a predetermined or critical speed of rotation of the driven shaft has been attained, upon synchronization or approximate synchronization of the speed of rotation of the driving shaft with that of the driven shaft.

Another object of the invention is to provide an automatic transmission adaptable for varying the driving connection ratio between the driving shaft and the driven shaft from an intermediate gear ratio to a high gear ratio or from a high gear ratio to an intermediate gear ratio under a plurality of predetermined conditions optionally selectable by the operator of the vehicle.

Another object of the invention is to provide a means whereby the automatic gear changing mechanism may be locked out so that a manual selective shift may be made by the operator of the vehicle, from automatic high gear ratio to a selective intermediate gear ratio, or from an automatic intermediate gear ratio to a selective high gear ratio at any time without regard to the speed of the engine, or of the vehicle, without the necessity of declutching, and without manually opposing the action of the automatic gear changing mechanism.

Another object of the invention is to provide, in connection with an automatic transmission, means for synchronizing the speed of the driving shaft with that of the driven shaft, or reducing the relative difference between the speeds of rotation of said shafts, so that the automatic change from one gear ratio to another gear ratio may be effected without disconnecting the engine clutch.

Another object is to provide an automatic transmission in which all of the gear changes can be accomplished only while the gears to be meshed are synchronized so that any shock or "clashing" of gears is eliminated.

Another object of the invention is to provide an automatic transmission in which a change from a high to an intermediate gear ratio may be automatically effected when the speed of rotation of the driven shaft attains a predetermined or critical rate of speed.

Another object is to provide an automatic transmission which is relatively simple in design and construction and which readily lends itself to commercial production.

Other objects and advantages will appear from the following description:

Referring to the drawings, of which there are five sheets,

Fig. 1 is a view showing the installation of our automatic transmission in an automotive vehicle;

Fig. 2 is a longitudinal side elevational view partially in section of a preferred form of our automatic transmission having a front end free wheeling unit;

Fig. 3 is a longitudinal view partly in section showing a different method of incorporating a free wheeling unit in the automatic transmission illustrated in Fig. 2;

Fig. 4 is a top plan view of the automatic shifting mechanism taken generally on the line 4—4 of Fig. 2;

Fig. 5 is a vertical transverse sectional view of the mechanism for controlling the automatic shifting apparatus taken generally on the line 5—5 of Fig. 2 and looking in the direction of the arrows;

Fig. 6 is a vertical cross sectional view taken on the line 6—6 of Fig. 2 and showing parts of the jaw clutch and yoke rods in detail;

Fig. 7 is an enlarged view taken on the line 7—7 of Fig. 2 and showing details of the jaw clutch mechanism;

Fig. 8 is a diagrammatic view of the gear shift positions for the automatic transmission illustrated in the preceding figures and as seen from the position of the operator of the vehicle;

Fig. 9 is a side elevational view partly broken away illustrating a modification of the mechanism for controlling the automatic shifting apparatus;

Fig. 10 is a top plan view on the line 10—10 of Fig. 9 and showing the controlling mechanism and shifting apparatus;

Fig. 11 is a cross sectional view taken on the line 11—11 of Fig. 10 and illustrating the details of the controlling mechanism;

Fig. 12 is a cross sectional view taken on the line 12—12 of Fig. 11 showing details of the vacuum valve controlling governor;

Fig. 13 is a view illustrating a modification of our invention and showing a two forward speed transmission using a jaw tooth clutch which is adapted to effect an automatic shift from low to free wheeling high, or vice versa;

Fig. 14 is a top plan view taken generally on the line 14—14 of Fig. 13 and showing the controlling mechanism and shifting apparatus for the transmission illustrated in Fig. 13;

Fig. 15 is a side elevational view partly in section illustrating a modification of our invention and showing a different type of clutch which is adapted to effect an automatic shift between low and high gear; and Fig. 16 is a diagrammatic view of the gear shift positions for the automatic transmission illustrated in Fig. 13 and as seen from the position of the operator of the vehicle.

Referring to Figs. 1, 2 and 4 of the drawings, a portion of an automotive vehicle is illustrated having an engine 1, an engine clutch 2 and a transmission 5, all suitably secured to the main frame indicated generally at 4. Mounted upon the frame 4 and above the transmission 5 are the floor boards of the compartment usually occupied by the operator of the vehicle and in which a throttle control 10 is provided for regulating engine speed. To the rear wall of the transmission 5 a housing 6 is suitably secured for enclosing the speedometer mechanism. Projecting from the housing 6 is a portion of the main or drive shaft 7.

A housing 8 mounted upon the cover of the transmission 4 is internally provided with a shoulder 9 providing a bearing 11 for an annular enlarged portion 12 of a gear shift lever 13. A knob 14, formed on the bottom end of the gear shift lever, is adapted for engagement with the gates carried by the yoke rods. A plurality of slots 15 are provided at the upper end of the housing 8 in the shoulder 9 for receiving trunnions 16 projecting from the annular enlarged portion 12 of the gear shift lever. A cap 17 is threadedly secured to the upper end of the gear shift lever housing 8. Disposed around the gear shift lever and between the cap 17 and the annular enlarged portion 12 of the gear shift lever is a coil spring 18 for resiliently holding the gear shift lever in a vertical position.

The transmission case is provided with two internal transverse walls which divide the transmission case into a forward free wheeling compartment, a main gear compartment and a compartment for housing the mechanism controlling the shifting apparatus. The forward wall 20 of the transmission case provides a support for the driving shaft bearing 24 which is secured in the aperture 26 by retaining rings 25. A driving shaft 27 is connected to the engine 1 of the automotive vehicle through a clutch 2, and is counterbored at 29 to receive the forwardly projecting end of an intermediate shaft 31. Intermediate shaft 31 is journaled in a bearing 32, suitably secured in an aperture in the wall 21, such as by a retaining washer 34 held in place by a snap ring 35.

A hub 37 is splined to the driving shaft 27 adjacent the end thereof and is provided with radial gear teeth 38 and an annular groove 40. A driving member 42 of an overrunning clutch, indicated generally at 43 and of well known construction, is splined to one end of the driving shaft 27 and is provided about the periphery thereof with a series of cammed surfaces and for each of which there is provided one of a series of rollers 45 which are adapted to engage the inner surface of a driven member or shell 46 for providing a one-way drive between the driving and driven members. A thrust washer 49 is disposed between the end of the driving member 42 and a shoulder 48 on the shell 46. A washer 51 held in place by a snap ring 52 serves to retain the rollers 45 in position between the driving and driven members of the overrunning clutch. The shell 46 is splined to the intermediate shaft 31, forward of the bearing 32, and is held in place by a snap ring 33.

The operation of the overrunning clutch is such that the driving shaft 27 will drive the intermediate shaft 31 through the driving member 42, rollers 45 and driven member or shell 46, but will permit the intermediate shaft 31 to overrun, or rotate at a speed greater than that of the driving shaft 27.

Disposed about the inside of the shell 46 adjacent its outer end are a set of teeth 53 which are adapted under certain conditions to mesh with the teeth 38 on the hub 37. A Bowden wire control (not shown) may be positioned on the dash board in the driver's compartment of the automotive vehicle to operate a shifting fork (also not shown) which is adapted to be received in the groove 40 for the purpose of shifting the hub to mesh the teeth 38 with teeth 53, thereby locking the intermediate shaft 31 to the driving shaft 27 and locking out the overrunning clutch mechanism. This may be desirable under certain driving conditions in order to keep the vehicle under a greater degree of control. When the overrunning clutch 43 is locked out, free wheeling is eliminated in all speeds.

The extreme forward end of the intermediate shaft 31 is journaled in a bushing 55 in the innermost end of the counterbore 29 in the driving shaft. The driven shaft 7 is counterbored at its forward end to receive a reduced portion 61 of the intermediate shaft 31 and is provided with a roller bearing 63 for supporting the same. The driven shaft 7 is journaled at its forward end in a bearing 65 mounted in an aperture in wall 22 of the transmission casing 5. The bearing is retained therein by a plate 66 suitably secured to the wall 22 of the transmission casing, such as by bolts 67 and by a snap ring 68. A similar bearing 70 is secured in the housing 6 carried by the rear wall 23 of the transmission casing for supporting the rear end of the driven shaft 7. The housing carried by the rear wall 23 of the transmission casing provides an enclosure for the speedometer gear 71, worm 72 and shaft 73. Gear 71 is mounted upon a coupling member 74 which is fixedly mounted upon the driven shaft 7.

A countershaft 75 is journaled in walls 21 and 22 of the transmission casing and is locked against rotation by bolt 76 which is threadedly secured in the bottom of the casing 4 and engages an aperture 77 in the countershaft 75. The countershaft 75 carries freely rotatable thereon as a unit, a cluster of gears comprising a pair of helical gears 78 and 79 and pinion gears 80 and 81. Suitably formed on the intermediate shaft 31 is a helical gear 82 which is in constant mesh with helical gear 78 on countershaft 75. A second helical gear 83 is carried on a bushing 85 freely mounted on the shaft 31 and is adapted to mesh with gear 79 on the countershaft. A thrust washer 86 is disposed on the intermediate shaft 31 between gears 82 and 83. An annular ring 88 providing a thrust member for the helical gear 83, is keyed to the intermediate shaft 31 by pin 90' and is maintained in position adjacent the gear 83 by a snap ring 91. Gear 83, which is in constant mesh with gear 79, is provided with a series of jaw teeth 92 on one face thereof.

Referring to Fig. 7, which illustrates the details of the jaw clutch mechanism, it may be seen that the gear 83 is provided with a set of four jaw teeth 92 disposed around one face thereof, which are provided with cammed or pitched surfaces or faces 93. A jaw clutch member 90 carried on a bushing 96 freely mounted on the intermediate shaft 31 is provided with a set of pitch faced jaw teeth 94 adapted to engage teeth 92, but the faces of which teeth are pitched in a direction opposite to that of the pitched surfaces 93 on the teeth 92.

It is desirable to pitch the jaw teeth 92 and 94 in the manner illustrated, in order to prevent the driven shaft, to which the clutch member 90 may be connected, when rotating faster than the driving shaft, or than the gear 83, from picking up the engine through the same with a consequent breakage of parts, assuming over-running clutch 43 was omitted or locked out. If the overrunning clutch 43 is used and cannot be locked out, it would be immaterial, as far as the function or operation is concerned, whether the surfaces of the jaw teeth are pitched in a direction opposite to that shown, or are disposed so that the faces of all of the teeth will lie in two parallel planes, or whether the teeth used are stepped, staggered or otherwise formed, so long as intermeshing members are provided on the gear 83 and clutch member 90, since the overrunning clutch 43 would permit the intermediate shaft 31 to overrun the driving shaft 27.

The jaw clutch member 90 is provided on its opposite face with a set of jaw teeth 95, pitched similarly to teeth 92 and which are adapted under certain conditions to mesh with jaw teeth 97 on clutch member 98 which is splined on the shaft 31 and retained in position by snap rings 100. Jaw clutch member 90 is also provided with a series of radial teeth 101.

The clutch member 90 is provided with a spring pressed poppet 91' which is adapted to engage in annular grooves 92' or 93' provided in the intermediate shaft 31. These grooves are adapted to engage the poppet 91' for the purpose of holding the clutch member 90 in either of its positions until the mechanism for moving the clutch member 90 has built up sufficient force to snap the clutch member from one position to the other. This will insure a positive disengagement of the clutch from one member and engagement with the other member in a single operation and will eliminate any possibility of having the clutch disengaged from one member and not immediately engaged with the other member. The spring pressure of the poppet 91' may be varied to alter the speeds at which automatic changes in the driving gear ratio are effected.

As shown in Figs. 2 and 7, the jaw clutch mechanism is in neutral position. Assuming that the driving shaft 27 is being rotated by the engine, gear 83 and clutch member 90 will rotate at a reduced rate of speed with respect to the rate of speed of the driving shaft 27 because such gear is driven through the speed reduction gears 78 and 79 on the countershaft. Clutch member 98 provided with pitch faced jaw teeth 97 and splined to the intermediate shaft, will rotate at the same rate of speed as the driving shaft 27, because such member is directly connected through the shaft 31 and overrunning clutch 43 with the driving shaft, but will rotate at a greater rate of speed than gear 83 and clutch member 90. The jaw teeth 95 and 97 are provided with pitched surfaces 95' and 97' which are oppositely disposed with respect to each other so that rotation of member 98 at a rate of speed greatly in excess of clutch member 90 will cause the teeth 97 to "jump" the interstices between the teeth 95 on the clutch member 90 when the same is moved to the right for engagement with member 98.

The teeth 95 and 97 will not interlock when the member 98 is rotating at a much faster rate of speed than that of the clutch member 90, but will interlock if the speeds of the members are approximately the same. When the teeth 97 "jump" the interstices between the teeth 95, a noise is created thereby, varying in intensity with the difference in speeds between the members 90 and 98. The noise will also vary with the pitch of the surfaces 95' and 97' and with the number of teeth used, the use of a lesser number of teeth permitting a reduction of the pitch of the surfaces and the use of a greater number of teeth necessitating an increase of the pitch of the surfaces 95' and 97'.

Deceleration of the speed of rotation of the member 98 until it approximates that of member 90, will permit the teeth to drop into the corresponding interstices on the engaging member. If the jaw clutch member 90 tends to rotate faster than member 98 before the teeth engage, the shoulders formed at the high points of the teeth will engage. A maximum circumferential travel of less than ninety degrees (90°) may be necessary to effect engagement of the shoulders formed at the high points of the teeth 95 and 97, depending upon the relative positions of such shoulders at the time when both members are traveling at the same rate of speed. Subsequent relative acceleration of the speed of rotation of the member 98, or reversal of drive, such as by an increase in the speed of the driving shaft 27, will release the torque between the shoulders of the teeth 95 and 97 and permit such teeth to drop into their corresponding interstices before torque is applied between the engaging shoulders formed on the low points of the teeth 95 and 97. The jaw teeth 92 and 94 on the gear 83 and clutch member 90 are adapted to engage in the same manner except that the teeth are so disposed that the clutch member 90 is adapted to overrun the gear 83 until the speeds thereof are approximately synchronized. Disengagement of the jaw teeth 95 and 97 prior to interlocking of the teeth 94 on clutch member 90 with teeth 92 on gear 83 will take place upon release of torque between teeth 95 and 97 incident to closing of the engine throttle 10.

Although we have shown the jaw clutch members provided with a set of four jaw teeth, it may be desirable under some circumstances to use a different number of jaw teeth. In determining the desirable number of teeth to be used under any given set of conditions, the effects of noise due to the "over-ratcheting" or "jumping" of the jaw teeth before interlocking and of "shocks" resulting when the driven shaft picks up the driving shaft and/or engine, should be considered. Use of an overrunning clutch, such as 93, practically eliminates such shocks. The use of a lesser number of teeth than four would permit a reduction of the pitch of the surfaces of such teeth, thereby decreasing the noise due to the "over-ratcheting" or "jumping" of the teeth before interlocking, but would increase the maximum circumferential travel necessary to effect engagement of the jaw teeth with a consequent increase in the "shock" attending such engagement. An increase in the number of jaw teeth would produce effects just the reverse of that described—that is, the noise would be increased due to a greater number of teeth and a greater pitch to such teeth, but the possible "shock" would be reduced due to a lesser degree of maximum circumferential travel being required.

Mounted upon the forward end of the driven shaft 7 is a hollow clutch member 103 provided with radial external teeth 104 and adapted to envelope a clutch member 98 provided with jaw teeth 97 and mounted on the intermediate shaft. A sleeve 105 is provided with a series of internal teeth 106 which are adapted to mesh with and slide upon the teeth 104 of the clutch member 103. A gear 110 is slidably splined on the driven shaft 7 and is adapted to mesh with gear 80 to provide a low gear driving connection with the driving shaft and to mesh with idler gear 112 mounted upon a shaft 114, which gear is in constant mesh with gear 81, to provide a reverse gear driving connection between the driving shaft and the driven shaft.

A sleeve 115 having a pair of grooves 116 and 117 is slidably positioned on the driven shaft 7 and is resiliently held in the position shown in Fig. 2 of the drawings. A collar 118 fixed to rotate with the driven shaft 7 and secured against lateral displacement by snap rings 119, is provided with a series of arms 120. A compression spring 121 is disposed about the driven shaft 7 between the sleeve 115 and the collar 118 for the purpose of biasing the sleeve to the left. Pivoted to each arm 120 is a bell crank lever 122, one end of each of which is adapted to engage in groove 117 and the other end of each of which is weighted as at 123 to provide a series of centrifugal weights. Groove 116 is adapted to receive a fork 125 carried by the yoke rod 160. A drain plug 126 is provided at the bottom of the casing 5 for the purpose of draining the oil from the same.

Slidably positioned above the gearing and secured in the walls of the transmission casing are a series of yoke rods which serve to carry the shift forks and which are actuated by movement of the gear shift lever 13. Referring particularly to Fig. 4, yoke rod 130 is provided with a series of notches 131, 132 and 133, respectively. These notches are adapted to engage a spring pressed poppet, such as that shown at 134, for the purpose of holding the rod against accidental displacement. The notches correspond respectively with the "reverse", "neutral" and "low" positions of the fork 136 carried by the rod 130.

Secured upon the yoke rod 130 by a bolt 137 is a collar 135 which carries a shifting fork 136 which is adapted to engage a groove 138 on the gear 110 for the purpose of moving the same to the left into engagement with the gear 80 for placing the driven shaft 7 in low gear ratio with respect to the driving shaft, and to move the gear to the right into engagement with idler gear 112 for the purpose of placing the driven shaft 7 in reverse ratio with respect to the driving shaft 27. To accomplish this, the operator of the vehicle moves the handle of the gear shift lever to the left, (looking at Fig. 8), whereupon the knob 14 at the bottom end of the gear shift lever 13 will engage a gate 140 carried by a collar 142 which latter is secured by a bolt 143 upon the yoke rod 130.

If the operator of the vehicle moves the handle of the gear shift lever to the upper left hand corner, as shown in Fig. 8, the knob of the gear shift lever will engage the gate 140 and move the same to the right, (looking at Fig. 4), thereby bringing notch 131 into engagement with the poppet, so that the transmission will now be in reverse gear. By manipulating the lever so as to bring the handle of the same to the lower left hand corner, (looking at Fig. 8), the yoke rod 130 will be moved to the left, (looking at Fig. 4), to the position where the notch 133 will engage the poppet. In this position the gear 110 will engage the gear 80, having been moved into that position by the fork 136, and the transmission will be in low gear.

A second yoke rod 145, slidably secured adjacent the yoke rod 130 to the walls 21 and 22 of the transmission casing is provided with a pair of notches 146 and 147 on the under side thereof which are adapted to engage a poppet or detent 134. Midway of the yoke rod 145 is a collar 150, fixedly secured as by a bolt 152 to the yoke rod, which carries a shift fork 153 adapted to engage in a groove 154 in the internally toothed sleeve 105 for the purpose of shifting the same to the left, looking at Fig. 2, so that the teeth 106 thereof will engage with the teeth 101 on clutch member 90. A gate 155 adapted to receive the knob 14 at the bottom end of the gear shift lever is secured by a bolt 156 to the yoke rod 145 so that the knob 14 may be moved into engagement therewith, as shown in Fig. 4, and moved into engagement with the gate 140 on yoke rod 130. The yoke rod 145 is used for placing the transmission into automatic gear ratio, when the notch 147 will engage detent 134.

A third yoke rod 160 is secured in the upper end of the transmission casing in the walls 21 and 22 so as to be capable of sliding movement with respect thereto. The yoke rod 160 is provided with a pair of notches 161 and 162 on the under side thereof, a cutaway portion 163 and a flatted portion 165. A gate 166 is mounted on yoke rod 160 between two compression springs 167 and 168 so as to be capable of sliding movement with respect to yoke rod 160. A pin 170 carried by the yoke rod 160 holds the spring 167 in place against the gate 166. Collar 171 secured by bolt 172 to the yoke rod 160 engages one end of the spring 168 for holding the same in place and is provided with a shift fork 175 which is adapted to engage with an annular flange 176 on clutch member 90.

Carried on the upper side of the gate 166 is a cylinder 178 which is disposed transversely to the axis of the yoke rod 160 and which carries a pin 180 having a rounded head 181. Disposed between the head 181 of the pin 180 and a shoulder 182 in the cylinder 178 is a spring 179 which tends to hold the head of the pin in position, as shown in Fig. 4. The yoke rods 130, 145 and 160, as shown in Fig. 4, are in neutral position, and it will be observed that the mouth of the gate 166 is slightly offset with respect to the gates 140 and 155 so that it is impossible for the knob of the shift lever to enter the gate 166 from a neutral position.

Carried by the yoke rod 160 adjacent the flatted portion 165 thereof is a sleeve 183, having a bolt 185, the end of which engages the flatted portion 165 of the yoke rod 160. The sleeve 183 is mounted on the yoke rod 160 so as to be capable of sliding movement with respect thereto, and carries the fork 125. The sleeve 183 is provided with a pair of lateral arms 187, having a pin 188 pivotally supporting a rocker arm 190, which carries a pair of heads 191 and 192. A shaft 194 is secured slidably with respect to the walls 22 and 23 of the casing and is provided with a cutaway portion 195. The shaft 194 is resiliently held in its right hand position, by a spring 198 which is secured at one end to a pin 200 on the shaft 194 and at the other end to a headed pin 202 carried by the wall 23. Lug 197 on the shaft 194 limits the movement of the spring and shaft 194 in one direction.

Yoke rods 130, 145 and 160 are provided with a set of interlocks comprising a series of notches 205 disposed in the adjacent sides of the yoke rods and a plurality of slidable pins 206 and 207 for engaging said notches in such a manner that it is impossible to move more than one yoke rod at a time. Movement of one of the yoke rods moves one of the pins out of the notch on such yoke rod and into a notch on the adjacent yoke rod.

Referring to Fig. 3 of the drawings, there is shown a modified form of part of a transmission incorporating a free wheeling unit or overrunning clutch, similar in design to that previously described, in that part of the transmission between the intermediate and driven shafts. In this modification the overrunning clutch is omitted from the front end of the transmission which will have the effect of thereby greatly shortening the length of the transmission casing and enabling the intermediate shaft to be made integral with the driving shaft 27.

The driving shaft 27 is provided with a series of cammed faces radially disposed about its periphery, between which and the inner surface of clutch member 98 a series of rollers 210 are carried. Thrust washers 212 keyed to the driving shaft by pins 214 and held in place by snap rings 216 are provided for holding the rollers 210 in place between the clutch member 98 and the driven shaft 27. The operation of this overrunning clutch is similar to that shown and illustrated in Fig. 2 of the drawings, but by locating the overrunning clutch member as shown in Fig. 3, free wheeling is provided only in high gear and cannot be locked out, whereas in the device illustrated in Fig. 2, free wheeling is optionally provided in all speeds.

As illustrated in Figs. 2, 4, 5, 6 and 7, the transmission is in neutral gear; that is, there is no driving connection between the driving shaft 27 and the driven shaft 7. Manipulation of the gear shift lever 13 into low position—that is, in the lower left hand position (see Fig. 8), will cause the knob portion of the gear shift lever 13 to engage gate 140 for moving the yoke rod 130 to the left (looking at Fig. 4), to a position where the notch 133 will engage a detent such as 134, by which the fork 136 will be shifted to the left which will cause the gear 110 to slide upon the driven shaft 7 to mesh with the gear 80 on the countershaft 75. The car will now be in low gear ratio, and the drive will be from the driving shaft 27, through the overrunning clutch 43, intermediate shaft 31, gears 82, 78, 80 and 110 to driven shaft 7. Driving connection for reverse gear will be similar except that gear 110 will be in mesh with idler gear 112 which is in constant mesh with gear 81. Reverse gear is effected by moving the gear shift lever to the upper left hand corner (looking at Fig. 8), which will cause the yoke rod 130 to be shifted until the notch 131 engages with a detent such as 134.

It will be noted that when the transmission is in neutral position, jaw teeth 92 on gear 83 are in interlocking engagement with jaw teeth 94 on the jaw clutch member 90 and that when the engine is operating, the clutch member will be rotating on the intermediate shaft and be connected to the driving shaft through the intermediary of overrunning clutch 43, intermediate shaft 31, gears 82, 78, 79 and 83 and interlocking jaw clutch teeth 92 and 94.

Manipulation of the gear shift lever into the automatic (second and high) position, as shown in Fig. 8, will cause knob 14 on the bottom end of the gear shift lever 13 to engage gate 155 for moving yoke rod 145 to the position where notch 147 engages a detent 134 to shift fork 153 to the left (looking at Fig. 2), whereupon sleeve 105 will slide over the clutch member 90 until teeth 101 and 106 are meshed. The drive connection will now be from the driving shaft through the intermediary just previously described, plus the clutch member 90, sleeve 105 and clutch member 103 which may be formed on the driven shaft.

The free wheeling unit or clutch may be omitted from our automatic transmission, as it will operate satisfactorily without such a unit. The use of a free wheeling unit as illustrated in Fig. 2, renders use of engine clutch entirely unnecessary except when starting the vehicle from rest, and also eliminates any possible "shock" which might attend an automatic change of gears from "intermediate" to "high" or vice versa. In the modification of the free wheeling mechanism illustrated in Fig. 3, operation of the clutch would be necessary in order to effect a manual shift from low to automatic gear position. It will be necessary, however, when shifting from low to automatic, using the free wheeling mechanism illustrated in Fig. 2, to release engine throttle control 10 temporarily in order to permit the engine to reduce its speed below that of the driven member 46 of the overrunning clutch member.

When the car is in automatic second position, acceleration of the speed of the driven shaft 7, will, when a predetermined speed is obtained, dependent upon the strength of the spring 121, tend to cause the centrifugal weights 123 to fly outwardly, for pivoting bell crank levers 122 about their pivots, which would cause the arms of the bell crank levers engaging in the groove 117 of the sleeve 115 to move the sleeve to the right against the force of the spring 121. The shift fork 125, engageable in the groove 116 in the sleeve 115, is adapted to be moved to the right therewith for moving the sleeve 183, the rocker arm 190, which is carried by the sleeve 183, the head 192, and the yoke rod 160, the shoulder 201 of which is engaged by the head 192, to the right, thereby to shift clutch member 90 out of engagement with gear 83 and into engagement with member 98 through the medium of fork 175.

Operation of the centrifugal weights will, through the intermediary just described, move the shift fork 175 to break the driving connection between the jaw teeth on the gear 83 and jaw clutch member 90, upon release of torque between such teeth incident to closing of the engine throttle—that is, break the interlocking teeth connection shown in Fig. 7, and will move the clutch member 90 to the right where the jaw clutch teeth 95 will engage the corresponding teeth 97 on clutch member 98.

It will be remembered that sleeve 105 interlocks teeth 101 on jaw clutch member 90 and teeth 104 on gear 103. Jaw clutch teeth 95 will not interlock with the teeth 97 until the speeds of members 90 and 98 are approximately synchronized—that is, until both are traveling approximately at the same rate of speed. If the member 98 is traveling at a faster rate of speed than the jaw clutch member 90, the teeth 97 will not mesh with the teeth 95, but will jump the interstices due to the cammed surfaces 95′ and 97′ of the teeth. The introduction of a free wheeling or overrunning clutch mechanism between the driving shaft and the gear 98, as shown in Fig. 2 or in modification of Fig. 3, will permit such teeth to interlock or engage practically without any "shock" or "clash".

When the gear ratio is changed from a second gear ratio to a high gear ratio, the drive will then be direct from the driving shaft 27, through overrunning clutch 43, intermediate shaft 31, clutch member 98, teeth 97, meshing with teeth 95 on clutch member 90, teeth 101 on clutch member 90 meshing with teeth 106 on sleeve 105, which teeth 106 also mesh with the teeth 104 on the member 103 which is formed on the driven shaft 7. It will be noted that when the transmission is in automatic position, the gate 155 is opposite the gate 166 so that when it is desired to shift from automatic high position to a manually selective second, manipulation of the gear shift lever to such position, (see Fig. 8), will cause the knob 14 to move the pin 180 against the compression of the spring 182 in order to enter the gate 166. Movement of the yoke rod 160 to a point where the notch 162 engages the detent 134, will shift fork 175 to move the jaw clutch member 90—that is, move the teeth 95 of the jaw clutch member 90 out of engagement with the teeth 97 of the gear 98 upon release of torque between such teeth incident to closing of the throttle and move the teeth 94 into interlocking engagement with the teeth 92 on the gear 83, whereupon the driving connection will be as previously described, for automatic second gear ratio.

The lost motion connection between the sleeve 183 and the yoke rod 160 will permit the latter to be shifted without opposition from the centrifugal weight mechanism. When the automatic shift from intermediate to high is made, the rocker arm 190 carried by the sleeve 183 is moved to the right, looking at Fig. 4, and moves the yoke rod 160 with it because of the engagement of head 192 with shoulder 201 on yoke rod 160. When the yoke rod 160 has been moved to a position where notch 161 will engage a poppet, such as 134, the head 192 will have started down the incline of the cutaway portion 195 on the shaft 194 to free itself from engagement with the shoulder 201. The yoke rod 160 may then, if desired, be manually shifted to selective second gear ratio, as previously described, without opposition from the centrifugal weight mechanism, which will retain the sleeve and rocker arm in their right hand position.

A slidable bar 512, supported at one end in a seat 513 in the wall 22 of the transmission case and at the other end by a headed pin 515 extending through a bifurcated portion of the bar and secured to the side wall of the case 5, is provided with an arm 514 having a fork 516 for engaging a lower portion 14 of the shift lever 13. That end of the bar slidable within slot 513 is provided with a pair of notches 522 and 524, the latter of which is adapted to be engaged by a spring pressed poppet 526 received in a bore in the case and retained therein by screw 528 for holding the bar against undesirable movement.

An interlock 520 is adapted to drop into notch 522 to permit movement of shaft 194 and to be moved into engagement with notch 521 in the shaft 194 by shifting of bar 512 for locking shaft 194 against movement for the purpose of locking out the automatic speed changing mechanism whenever a forced shift from either of the automatic positions to selective second or high is made. When the shaft 194 is locked against movement, the shift rod 160 will be freed from movement responsive to operation of the centrifugal weight mechanism and will stay in the position to which it is manually moved by the shift lever which simultaneously engages fork 516 carried by the bar 512 for the purpose of moving the same whenever a manual shift to selective second or high is made. The head 181 of the spring pressed pin is rounded to hold the gear shift lever in either selective second or high by camming the knob 14 into corners between the end of the gate 166 and sides of the gate 155.

If, when the transmission is in automatic high, the speed of the driven shaft is decelerated to effect an automatic shift from high to intermediate, the centrifugal weights 123 will collapse when the speed of the driven shaft attains a predetermined rate whereupon the sleeve 115, fork 125 and sleeve 183 will be moved to the left with the assistance of spring 121, to move the head 192 on the rocker arm to reengage shoulder 201. The bolt 185 engaging the flatted portion 165 on the yoke rod 160 will engage the shoulder on the yoke rod at the end of the flatted portion and move the yoke rod to the left to a position where notch 162 will engage a poppet such as 134. Fork 175 will be shifted thereby to move clutch member 90 out of engagement with member 98 and into engagement with gear 83. Before the automatic shift can be effected, the torque between the jaw teeth 95 and 97 must be released, such as by closing of the engine throttle.

If a manual change from automatic second to selective high is desired, the knob 14 of the shift lever may be forced into gate 166 against the tension of spring pressed pin 180 for the purpose of moving yoke rod 160 to the right to interlock clutch members 90 and 98 through jaw teeth 95 and 97. Since the shoulder on the yoke rod 160 formed by the flatted portion 165 now abuts the end of bolt 185, the yoke rod must be manually shifted against the compression of spring 121 to get selective high, but the shift will be assisted by tendency of the centrifugal weights to move outwardly.

The springs 167 and 168 are adapted to take up the movement of the clutch member 90 caused by the "jumping" of the jaw teeth during manual shifting and before the interlocking of the teeth. These springs position the gate 166 on the yoke rod 160 so as to be capable of lateral movement with respect thereto.

The relative positions of the selective high and selective second gear positions may be changed to conform to present standard shifts wherein second speed position is at the upper right hand corner and high speed position is at the lower right hand position, by the use of suitable mechanism to reverse the action of the shift lever, such as by using a bell crank lever to cooperate with the end of the shift lever to reverse the movement thereof.

Referring to Figs. 9 to 12, which illustrate a modified form of the mechanism for automatically operating the shifting mechanism, there is shown a valve mechanism for controlling the application of vacuum to a piston which actuates the shifting mechanism. Referring to Fig. 9, there is shown a transmission case 5 having a housing 6 for encasing the speedometer mechanism, which housing may be secured to the rear end of the transmission case in any suitable manner such as by bolts 250. The speedometer housing 6 is provided with an enlargement for accommodating the mechanism for controlling the operation of the vacuum valve. A cover plate 252 is secured to the housing as by bolts 254. In this modification the internal construction of the transmission is identical with that shown in Fig. 2 with the exception of that part of the yoke rod mechanism illustrated in Fig. 10, and with the further exception that the vacuum controlled apparatus is substituted in place of the centrifugal weight mechanism.

Speedometer gear 71 is affixed to the driven shaft 7 as by a key 256 and meshes with a worm 72 on the speedometer shaft 73. A bushing 258 is threaded into the housing 6 to provide a bearing surface for the speedometer drive shaft 73. The end of the speedometer drive shaft is reduced at 260 and journaled in the cover plate 252. The shaft 73 is splined intermediate the reduced portion 260 and the worm 72. A collar 262 having a plurality of arms 264 is splined on the shaft 73. Bell crank levers 266 are pivoted as at 268 to the arms 264 and are provided with weights 270 which are adapted under the influence of centrifugal force to fly radially outwardly. A hub 272, having a groove 274 and a drum-shaped shell 276, is slidably splined on the shaft 73 intermediate the reduced portion and the collar 262. One arm of each of the bell crank levers 266 is adapted to bear against the end surface of the drum 276 for the purpose of moving the same to the left when the centrifugal weights fly outwardly.

The cover plate 252 is provided with a passageway 278. A conduit 280 connected to a source of vacuum such as the intake manifold of an internal combustion engine, is connected by means of a suitable coupling 282 to one end of the passageway 278. A conduit 284 is connected to the other end of the passageway 278 and leads to one end of a vacuum cylinder 286. A valve member 290 disposed in a bore 292, intercepts the passageway 278 and is biased by a spring 294 to the right (looking at Fig. 11). The valve member is provided with an arm 298 for engaging in the groove 274 of the collar 272 so as to be moved thereby. A port 300 is provided in the valve member 290 for interconnecting the different portions of the passageway 278 to provide communication between the conduit 280 and the conduit 284. A second port 301 is provided in the valve member 290 for placing the vacuum cylinder in communication with atmosphere through conduit 284, port 301, bore 292 and aperture 303 in the cover plate. A plug 302 threadedly engages an enlargement in the bore 292 for holding the spring 294 in position.

The transmission is provided with a bearing surface 304 which supports a shaft 306. An arm 308 is attached to the external end of the shaft 306 by any suitable means such as by bolts 310 engaging a threaded end of the shaft 306. A piston rod 312 connected to a piston (not shown) in the vacuum cylinder 286 is pivotally connected at 314 to the slotted end of arm 308. A lever 315 is fixedly connected to the internal end of shaft 306. A shaft 194$^a$, rigidly affixed to the wall 22 of the case, has a sleeve 318 slidably secured thereupon, which is provided with a slot 320 adapted to receive one end of the lever 315. The sleeve is provided with a pair of arms 322 to carry a pin 324 on which is pivotally mounted a lever 326 having a diamond-shaped head 328 which is adapted under certain circumstances to engage in notch 330 in the yoke rod 160 or notch 332 in the shaft 194$^a$.

A lug 329 is provided on the yoke rod 160 for engagement with one of the arms 322 whereby the yoke rod may be moved in one direction. This modification of the invention will accomplish the same results as are accomplished with the centrifugal weight mechanism shown in Fig. 2, but the mode of operation is slightly different. Assuming the transmission to be in automatic second gear ratio, the driven shaft 7 will be driving the speedometer gear 71 which in turn meshes with the worm gear 72 on the shaft 73. When the speed of the driven shaft 7 attains a predetermined rate, the centrifugal weights 270 will tend to fly outwardly, causing the other ends of the bell crank levers 266 to press against the drum 276, thereby moving the same to the left, (looking at Fig. 11). Since the valve 290 is connected with the hub 272, port 300 will be moved into a position between the portions of the passageway 278 to provide communication between conduit 280 and conduit 284 and to close vacuum cylinder 286 to the atmosphere. The conduit 280 leads to a source of vacuum, which will cause the piston (not shown) in the vacuum cylinder 286, as soon as communication is established with the end of the vacuum cylinder 286, to be moved to the left, (looking at Fig. 9). This will cause the arm 308 to move the lever 315 to the right, which will tend to slide the sleeve 318 on the shaft 194$^a$. Since the head 328 of the lever 326 is connected to the arm and, as shown, is held in engagement with the notch 330 on the shaft 160, the yoke rod 160 will be moved to the right, when the piston in the vacuum cylinder is put in communication with a source of vacuum to effect an automatic shift from second to high. Notch 332 is provided in the shaft 194$^a$ for receiving head 328 to permit the yoke rod 160 to be shifted back to manual selective second position, without opposing the effect of vacuum on the piston in the vacuum cylinder 286. The piston (not shown) in the vacuum cylinder 286 will be held in its retracted position as long as the valve 290 is held open to permit the application of suction to the face of the piston. As soon as the valve member 290 moves to close the source of vacuum to the face of the piston and opens the same to the atmosphere, a spring in the vacuum cylinder will move the piston to change the gear ratio by an automatic shift from high to second gear ratio. To that end, the arm 322 on the sleeve 318 will then engage the lug 329 on the shaft 160 for moving the same to the left, which will shift clutch member 90 out of engagement with member 98 and into engagement with gear 83. If the transmission is in automatic second position and a manual shift to selective high is made, the knob 14 on the end of the shift lever will enter gate 166 and move yoke rod 160 to the right, the knob being held in selective high position by the camming effect of the rounded head 181 of the pin biasing the knob into a corner between the side of the gate 155 and end of gate 166. Movement of the yoke rod 160 to the right will carry sleeve 318 and lever 326 with it. The force of the spring in the vacuum cylinder will be insufficient to move the yoke rod 160 back to second speed when the lever is positioned in selective high.

Referring to the modification shown in Figs. 13 and 14, there is illustrated a two-speed transmission having a reverse gear, an automatic shift from low to high gear, using a jaw tooth clutch member, and an overrunning clutch in high gear. A transmission case 350 is provided with a series of walls 351, 352 and 353 which provide support for the yoke rod and shaft bearings. A driving shaft 355 is journaled in a bearing 356 supported by the wall 351 and retained therein by snap rings 358. A driven shaft 360 is journaled in a bearing 362 supported by the wall 352 and retained therein by a snap ring 363 and plate 364. A reduced front end portion of the driven shaft 360 is journaled in roller bearings 366 in the counterbored end of the driving shaft 355. A countershaft 368 which carries a cluster of gears is journaled at its opposite end in the walls 351 and 352 of the casing. The end of the driving shaft 355 is formed to provide a helical gear 370 which is adapted to be in constant mesh with a helical gear 371 on the countershaft 368. A shell 372 forming the driving part of an overrunning clutch mechanism is splined and keyed to the driving shaft 355.

A driven member 374 of the overrunning clutch mechanism is fitted to a bushing 376 which in turn is fitted to driven shaft 360 and adapted to rotate therewith. The driven member 374 of the overrunning clutch is provided with a series of cammed faces radially spaced about its periphery. For each of the cammed faces (not shown) there is provided a roller 378 which is adapted to roll upon the cammed surface and upon the inner surface of the drum 372. The operation of this overrunning clutch member and the construction is identical with that illustrated in Figs. 2 and 3 of the drawings. Thrust washers 379 are provided within the drum 372 for the purpose of retaining the rollers 378 in position. A snap ring 380 is secured adjacent the outer end of the drum 372 for the purpose of confining one of the washers 379 in position.

The driven member 374 of the overrunning clutch mechanism is provided with a series of jaw teeth 382, the faces of which are tapered or pitched. A clutch member 385 slidably splined on the driven shaft 360 is provided on both of its faces with a series of tapered jaw teeth 386 and 387. The jaw teeth 386 are adapted to interlock with the teeth 382 on the driven member 374 of the overrunning clutch. Jaw teeth 387 on the clutch member 385 are tapered similarly to the teeth 382 and are adapted to interlock with jaw teeth 388 carried by a helical gear 390 which is freely mounted upon the driven shaft 360, but confined against lateral movement. The clutch member 385 is provided with a groove 392 which is adapted to receive a fork 394.

Clutch member 385 is splined to the driven shaft 360 for rotation therewith and is adapted to connect the driving shaft to the driven shaft directly or through a train of reduction gearing. Interlocking engagement of jaw teeth 387 and 388 on clutch member 385 and gear 390, respectively, will provide a low or reduced gear driving connection between the driving and driven shafts. Interlocking engagement of teeth 387 and 388 can only be effected when the engine is operating and the driven shaft is at rest, by breaking the driving connection between the engine and the transmission such as by operating a clutch, which will have the effect of stopping the rotation of gear 390 so that clutch member 385 carried on the driven shaft may be moved into engagement therewith. As long as gear 390 rotates faster than clutch member 385, the teeth cannot interlock because the pitched faces thereof will tend to push clutch member 385 away from gear 390 and cause the teeth to "jump" the interstices between the teeth on the cooperating member.

Similarly, jaw teeth 382 on member 374 will not engage teeth 386 on the jaw clutch member whenever member 374 is rotating faster than member 385. The operation of the jaw teeth illustrated in this modification of the invention is identical with that of the jaw teeth illustrated in Figs. 2 and 7.

The helical gear 390 is in constant mesh with a gear 393 which is one of the gears on the countershaft 368. Because of the constant intermeshing of the gears 370, 371, the gear 393 is adapted to drive the helical gear 390 upon the driven shaft 360. The countershaft carries a third gear 396 which is in constant mesh with an idler gear 397 carried upon a shaft (not shown) and the idler gear 397 is in constant mesh with a gear 400 freely rotatable on the driven shaft 360. The driven shaft 360 carries a thrust washer 401 between the gear 400 and the bearing 361. The gear 400 is provided with a set of internal teeth 402 which are adapted to mesh with teeth 403 carried by a hub 404 which is slidably splined to the driven shaft 360 and which is provided with an annular groove 405 which is adapted to receive a fork 407 carried by yoke rod 430.

The gear 400 is adapted to rotate with the driving shaft 355, since it is connected thereto through a series of gears 397, 396, 371 and 370. When the hub 404 is moved to the right (looking at Fig. 13), intermeshing of teeth 402 and 403 is adapted to lock the gear 400 to the driven shaft 360 to provide reverse gear.

The driven shaft 360 has fixedly secured thereto a hub 412 retained in position by snap rings 413, which hub carries a series of arms 415 similar in construction to the arms 120 shown in Fig. 2. Pivoted to each of the arms 415 by pivot pin 416 is a bell crank lever 417 having one end 418 provided with a weight and the other end 419 adapted to engage in a groove 420 in a sleeve 422 which is slidably positioned on the driven shaft 360. The sleeve 422 is provided with a second annular groove 424 which is adapted to receive a shifting fork 426, and is biased to the right by a compression spring 428 which is disposed between one face of the sleeve 422 and the hub 412.

The weights 418 are adapted to be moved radially outwardly under the action of centrifugal force to pivot the bell crank levers 417 on their pivots 416 for the purpose of moving the sleeve 422 to the left, looking at Fig. 13.

Slidably secured in the walls 351, 352 of the transmission casing 350 are a pair of yoke rods 430 and 431 which carry the forks 394 and 407 for shifting the members 385 and 404, respectively. The yoke rod 430 carries at one end thereof a collar 432, which may be secured by a bolt 434, and which carries the shifting fork 407. A collar 435 secured by a bolt 436 to the yoke rod 430 is provided with a gate 437 which is adapted to receive a knob 439 carried on the bottom end of the gear shift lever. Movement of the handle of the gear shift lever to reverse position, as shown in Fig. 15, causes the knob 439 to engage the gate 437 and move yoke rod 430 to the right, looking at Fig. 14, to a position where the notch 462 on the yoke rod engages a poppet 460, whereby the teeth 403 on the hub will have engaged the teeth 402 on the gear 404, so that the driven shaft 360 will be in reverse gear ratio with respect to the driving shaft 355.

The yoke rod 431 carries a sleeve or gate 440 held in position thereon by spring 444 and pin 446. A collar 447, carrying the shift fork 394, is secured to the shaft by a bolt 448 and engages one end of the spring 444. The yoke rod 431 also carries adjacent one end thereof a sleeve 450 secured thereto by a bolt 455 which carries the fork 426 for engaging in the groove 424 in the sleeve 422.

A predetermined speed of rotation of the driven shaft 360 will cause the weights 418 carried by the hub 412 to fly radially outwardly upon release of torque between the interlocking jaw teeth incident to closing of the engine throttle, thereby causing the lever 417 which engages groove 420 on the sleeve 422 to move the same to the left, looking at Fig. 14. Movement of the sleeve 422 to the left, will, by virtue of the fact that shift fork 426 engages groove 424 on the collar 422, move the sleeve 450 and the yoke rod 431 to the left, to a position where notch 458 engages a poppet such as 460. This leftward movement of the yoke rod 431 which carries collar 447, will cause shift fork 394 to move the clutch member 385 to the left, thereby moving jaw teeth 385 out of engagement with jaw teeth 388 and moving jaw teeth 386 into interlocking engagement with jaw teeth 382 on the driven member 374 of the overrunning clutch mechanism. It will be understood, of course, that before this action takes place, manipulation of the shift lever will have moved the clutch member 385 for moving the teeth 387 into engagement with the jaw teeth 388 on the gear 390, which will give the low gear driving connection.

A boss 452 is carried by the side wall of the transmission casing for the purpose of holding the gear shift lever in automatic position when the automatic shift from low to high takes place. The sleeve 440 provides a gate for the reception of the knob 439 carried by the gear shift lever. The sleeve gate 440 is provided with an offset portion 454 for the purpose of permitting the knob 439 to be locked in behind the boss 452 and against the tension of spring 444. This may be accomplished after the transmission is placed in automatic by moving the handle of the shift lever to the right.

After the car is sufficiently accelerated in low gear, the driven shaft 360 will attain a speed sufficient to cause the centrifugal weights 418 to fly radially outwardly, causing the operation just described, for placing the transmission in high gear ratio.

In the modification illustrated in Fig. 13, it will be necessary in order to permit the automatic shift from low to high to take place that the throttle governing the speed of the engine be temporarily released in order to relieve the pressure or torque between the interlocking teeth 387 and 388, so that these teeth may be disengaged after the actuation of the centrifugal weight mechanism.

When the driven shaft 360 has been decelerated to or beyond a predetermined rate of speed, the centrifugal weights will tend to collapse, and, if the power is temporarily reduced at such time to relieve the pressure or torque between the interlocking teeth 382 and 386, the sleeve 422 under the influence of the spring 428 will help, with the assistance of spring 444, to move the shifting fork 426 to the right, for the purpose of shifting the clutch member 385 out of engagement with member 374 and into engagement with the jaw teeth on the low gear 390 to effect an automatic shift from high to low gear.

The action of the centrifugal weight mechanism shown in Fig. 14 is practically identical with that shown in Fig. 4 except that in Fig. 14 the centrifugal weight mechanism is in a position reverse to that shown in Fig. 4. Because the transmission illustrated in Figs. 13 and 14 is only two speed forward and one reverse, for that reason there is only one forward gear shift position—that is, automatic position. The vehicle may be started in a forward direction by placing the transmission in automatic position, when the drive will be from driving shaft 355 to gears 370, 371, 393 and 390, jaw teeth 388 and 387, and clutch member 385 on to the driven shaft 360. As heretofore described, the automatic shift from low to high will be effected when the speed of the driven shaft 360 attains or exceeds a predetermined rate of speed, and when the operator of the vehicle momentarily releases the throttle governing the engine speed. The overrunning clutch mechanism practically eliminates any possibility of a shock when the jaw teeth interlock upon an automatic shifting into high, but it may be omitted without affecting the efficiency of the speed changing mechanism, if desired.

A manual control for obtaining a manual forced shift from automatic high to second may be provided similar to that disclosed in Figs. 2 to 7, if desired.

Fig. 15 illustrates a modified form of a clutch mechanism which may be used in place of the clutch mechanism illustrated in Fig. 13 and which may readily be adapted for use in the transmission illustrated in Fig. 2. In the clutch mechanism illustrated in Figs. 2 and 13, the shiftable clutch member must first be disconnected from one of the clutch elements before it is shifted into engagement with the other of the clutch elements. The shiftable clutch member of the clutch mechanism shown in Fig. 15 is connected through an overrunning clutch with the second speed gear and is adapted to be shifted to engagement with the high speed clutching element without being disconnected from the second speed driving gear.

The driven shaft 360' has suitably secured thereon, but adapted to rotate with respect thereto, a helical gear 390' in constant mesh with a helical gear on the countershaft such as gear 393. The helical gear 390' is provided with a hub 500 which carries a set of external radial teeth 502. A driving member 503 of an overrunning clutch mechanism is provided with an internal set of teeth 504 which are adapted to mesh with and slide over the teeth 502 on the hub 500. A series of rollers 505 are disposed between an inner annular surface of the driven member 385' of the overrunning clutch mechanism and external radially disposed cammed surfaces provided on the driving member 503. This clutch is adapted to provide a one-way drive between the helical gear 390' and the driven member 385' so that the driven member 385' will always rotate as fast as the helical gear 390', but will be free to overrun the same.

An annular groove 392' is provided on the driven member of the overrunning clutch mechanism for receiving a shifting fork carried by the yoke rod for the purpose of shifting or sliding the member 385'. The driven member 385' of the overrunning clutch mechanism is provided with an internal set of teeth 507 which are adapted to slide upon the driven shaft 360' and to mesh with the teeth or splines 510 carried thereby. A helical gear 370' is connected to or formed on the end of the driving shaft and is provided with an annular ring member 374' having a series of pitched surfaced jaw teeth laterally disposed around the face thereof. The driven member 385' of the overrunning clutch mechanism is provided with a series of pitched faced jaw teeth 386' which are adapted under certain circumstances to mesh with the jaw teeth 382' carried by the member 374' to provide a direct driving connection between the driving and the driven shafts.

The slidable member 385' of the clutch mechanism is shown in automatic second position, so that the drive between the shafts will be from helical gear 370' through the gears on the countershaft, helical gear 390', hub 509, driving member 503, and driven member 385', the teeth 507 of which are in mesh with the splines 510 on the driven shaft 360'.

The member 385' is adapted to be shifted to the right, looking at Fig. 15, to shift teeth 507 out of engagement with the splines 510 for the purpose of breaking the driving connection between the helical gear 390' and the driven shaft 360' and to permit the transmission to be placed in reverse gear ratio.

The surfaces of the jaw teeth 382', 386' are pitched so that the teeth 382' are adapted to overrun or ratchet over the teeth 386' until the speed of rotation of the member 374' falls below or is approximately synchronized with that of the member 385'. This is necessary to prevent the teeth on the driving member 374' from picking up the driven member 385' when the driving member is rotating at a greater rate of speed than the driven member, to prevent the possible breaking of parts of the transmission. When the speed of rotation of the driven member 385' keyed to the driven shaft 360' attains a predetermined or critical rate, the automatic gear changing mechanism, such as that shown in Fig. 13, is adapted to shift or slide the member 385' for meshing the teeth 382' and 386'. This action—that is, the automatic shifting from low to high, will not take place until the torque between the intermeshing teeth is released, such as by closing of the engine throttle, approximately to synchronize the speed of rotation of the driving member 374' with that of the driven member 385'. When the jaw teeth 382' and 386' engage, the teeth will drop into the interstices between the jaw teeth and the engaging member. The driving connection will then be from the driving shaft through member 374', interlocking teeth 382' and 386', and driven member 385', the teeth 507 of which are meshed with the splines 510 of the driven shaft 360'.

When the car is in automatic "high", the driven member 385' will be rotating at a greater rate of speed than the driving member 503 of the overrunning clutch, and for that reason, will overrun the second speed gear 390'. When the speed of the driven shaft 360' has been decelerated to that point where the automatic speed changing mechanism will be operable to effect an automatic shift from high to second gear, the driven member 385' will, upon release of torque between jaw teeth 382' and 386', be shifted out of engagement to break the high gear driving connection and to permit the helical gear 390 to drive the driven member 385' through the overrunning clutch, as previously described.

While several specific embodiments of our invention have been illustrated and described, it must be appreciated that many modifications may be made in the construction thereof without departing from the scope of the invention, and for that reason we do not desire to be limited to any particular form or arrangement except in so far as such limitations are included in the following claims.

We claim:

1. An automatic transmisison comprising a driving shaft, a driven shaft, change speed gearing adapted to interconnect said shafts in a plurality of different driving ratios, jaw clutch mechanism having pitched axial teeth surfaces operable only whenever approximate synchronization between the rotative speed of said teeth occurs for connecting said change speed gearing to said driven shaft in a plurality of different ratios, means operable responsive to a predetermined speed of rotation of the driven shaft for actuating said clutch mechanism to effect an automatic change in the driving ratio between said shafts, manually operable means for actuating said clutch mechanism to effect selective changes in the driving ratio between said shafts, and a lost motion connection between said manually operable means and said other means.

2. Automatically variable change speed mechanism comprising a driving shaft, a train of gears driven thereby, a driven shaft having a member mounted thereon for rotation therewith, a clutch mechanism for interconnecting said member and said train of gears for driving the driven shaft at a reduced speed ratio, a member on the driving shaft and mounted for rotation therewith, said clutch mechanism being adapted to interconnect said members on the driving and driven shafts for driving the driven shaft in synchronism with the driving shaft, a shift fork for actuating said clutch mechanism, means operable at any time after a predetermined speed of rotation of the driven shaft has been attained for automatically shifting said fork, and a manipulative shift lever for shifting said fork for changing the gear ratio without regard to the speed of the driving or driven shafts.

3. In an automatically variable change speed mechanism, a driving shaft, a driven shaft, gearing adapted for interconnecting said shafts in a plurality of different speed ratios, a clutch mechanism operable for effecting different relationships between said gearing and said shafts to provide a plurality of driving speed ratios between the driving shaft and the driven shaft, means operable at any time after a predetermined speed of rotation of the driven shaft has been attained for automatically actuating said clutch mechanism to provide a normal speed ratio between the driving shaft and the driven shaft, and manipulative means operable without opposing said means for operating said clutch mechanism to select a speed ratio between the driving and driven shafts, other than a normal one.

4. An automatically variable change speed mechanism comprising a driving shaft, a driven shaft, gearing for interconnecting said shafts in a plurality of different speed ratios, a clutch mechanism for selecting the driving speed ratios between the shafts, a shifting fork for operating said clutch mechanism and carried by a yoke rod, means operable at any time after a predetermined speed of rotation of the driven shaft has been attained for automatically moving said yoke rod to select a normal driving speed ratio with regard to the speed of the driven shaft, a manipulative lever for moving said yoke rod to select a driving speed ratio without regard to the speed of the driven shaft, and a lost motion connection between said yoke rod and said means to permit the operation of said manipulative lever without opposition from said means.

5. An automatic transmission having in combination a driving shaft, a driven shaft, a train of gears operatively connected with one of said shafts, a clutching element for each of said shafts and mounted to rotate therewith, a clutch member cooperable with said train of gears and said clutching elements for providing a plurality of driving speed ratios between the driving and driven shafts, means operable at any time after a predetermined speed of rotation of the driven shaft has been attained for automatically actuating said clutch member to provide a change in the driving speed ratio between the driving and the driven shafts, said clutch member being operable only upon a temporary reduction of the speed of rotation of the driving shaft relative to that of the driven shaft.

6. An automatically variable change speed mechanism comprising a driving and a driven shaft, a change speed gearing, and a clutch for interconnecting said shafts in a plurality of different speed ratios, a yoke rod carrying a shifting fork for operating said clutch, means operable by the driven shaft at any selected time after the speed of rotation thereof attains a predetermined rate and connected through a lost motion connection with said yoke rod for operating said clutch to effect an automatic change in the speed ratio between said shafts, and manipulative means connectible to said yoke rod for actuating said clutch to change the speed ratio between said shafts without regard to the speed of the driven shaft.

7. An automatically variable change speed mechanism comprising a driving and a driven shaft, means for interconnecting said shafts through a change speed gearing in a plurality of different gear ratios including a clutch for selecting the different gear ratios, means operable by the driven shaft at any selected time after the speed of rotation thereof attains a predetermined rate for automatically actuating said clutch to select a normal driving gear ratio between the driving and driven shafts, and whenever the torque between said shafts is released incident to a reduction of the difference between the speeds of rotation of said shafts, a lost motion connection between said clutch and said means for automatically actuating said clutch, and manipulative means connectible with said clutch and operable for changing the gear ratio between the driving and driven shafts without regard to the speed of rotation of said driven shaft.

8. An automatic transmission having in combination a driving and a driven shaft, gearing for interconnecting said shafts in a plurality of driving speed ratios and including a clutch operable for selecting the various driving speed ratios, a yoke rod carrying a shift fork for controlling said clutch, means controlled by the speed of rotation of the driven shaft for automatically actuating said yoke rod and shift fork, a lost motion connection between said means and said yoke rod whereby said yoke rod may be moved independently of said means, and a shift lever connectible to said yoke rod for manually moving the same independently of said means.

9. In a device of the class described, a driving shaft, a driven shaft, a jaw tooth clutch member connected to one of said shafts, a plurality of clutching elements, one of which is provided with jaw teeth, connected to the other of said shafts and adapted for driving engagement with said clutch member for interconnecting said shafts in a plurality of driving speed ratios, an overrunning clutch mechanism adapted to be disposed in one of the driving connections between said shafts, and means operable at any time after the driven shaft has attained a predetermined speed of rotation and upon a temporary reduction of the speed of rotation of the driving shaft for automatically shifting said clutch member into engagement with said jaw tooth clutching element for changing the driving speed ratio between said shafts.

10. Automatically variable change speed mechanism comprising in combination a driving shaft, a driven shaft having a member connected thereto to be rotated therewith, means driven by said driving shaft and connectible to said member, a clutch mechanism for interconnecting said means and said member for initiating the rotation of said driven shaft in an initial speed ratio, a member fixed to said driving shaft, said clutch mechanism being adapted to interconnect said member on said driving and driven shafts for driving said driven shaft at an increased speed ratio, centrifugal force actuated means responsive to the rotation of said driven shaft and operable at any speed thereof above a predetermined rate for shifting said clutch mechanism to interconnect said members, and a manipulative lever operable for shifting said clutch mechanism out of engagement with said driving shaft member and into operative relationship with said means to effect a selective change to an initial driving speed ratio.

11. In an automatically variable change speed mechanism, the combination of a driving shaft with a driven shaft, means including an overrunning clutch having members connected to each of said shafts, respectively, affording a one-way driving connection between said shafts, a clutch element associated with each of said shafts and adapted to be interconnected for providing a driving connection between said shafts and at a ratio higher than that afforded by said one-way drive, centrifugal force operated means responsive to the rotation of said driven shaft for interconnecting said clutch elements whereby said driven shaft will overrun said means and whereby said means will be effective for driving said driven shaft upon disconnection of said clutch element, and manipulative means for effecting a selective driving connection between said shafts and for rendering said centrifugal force responsive means ineffective.

CARL F. RAUEN.
ANO E. KILPELA.